(12) United States Patent
Matsuda et al.

(10) Patent No.: US 10,284,071 B2
(45) Date of Patent: May 7, 2019

(54) SEMICONDUCTOR DEVICE FOR CONTROLLING POWER SOURCE

(71) Applicant: MITSUMI ELECTRIC CO., LTD., Tokyo (JP)

(72) Inventors: Hiroki Matsuda, Zama (JP); Yukio Murata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 26 days.

(21) Appl. No.: 15/552,653

(22) PCT Filed: Feb. 17, 2016

(86) PCT No.: PCT/JP2016/054530
§ 371 (c)(1),
(2) Date: Aug. 22, 2017

(87) PCT Pub. No.: WO2016/136546
PCT Pub. Date: Sep. 1, 2016

(65) Prior Publication Data
US 2018/0019656 A1    Jan. 18, 2018

(30) Foreign Application Priority Data

Feb. 23, 2015   (JP) .................................. 2015-032442

(51) Int. Cl.
*H02M 3/335*     (2006.01)
*H02M 1/08*      (2006.01)
(Continued)

(52) U.S. Cl.
CPC ............... *H02M 1/08* (2013.01); *H02M 1/32* (2013.01); *H02M 3/33523* (2013.01); *H02M 2001/0012* (2013.01); *H02M 2001/322* (2013.01)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 8,937,471 B2    1/2015  Kobayashi et al.
9,148,049 B2    9/2015  Li
(Continued)

FOREIGN PATENT DOCUMENTS

JP    2012170289 A    9/2012
JP    2014204573 A   10/2014
WO    2012140840 A1  10/2012

OTHER PUBLICATIONS

International Search Report (ISR) and Written Opinion dated Apr. 26, 2016 issued in International Application No. PCT/JP2016/054530.
(Continued)

*Primary Examiner* — Bryan R Perez
(74) *Attorney, Agent, or Firm* — Holtz, Holtz & Volek PC

(57) ABSTRACT

A semiconductor device for power supply control includes an on/off control signal generation circuit which generates a control signal to turn on or off the switching element, a high-voltage input start terminal to which alternating-current voltage of AC input or voltage rectified in a diode bridge is input, a high-voltage input monitoring circuit connected to the high-voltage input start terminal and monitoring voltage of the high-voltage input start terminal, and a discharging unit connected between the high-voltage input start terminal and a ground point. When the high-voltage input monitoring circuit detects that a time for which the voltage of the high-voltage input start terminal is not lower than a predetermined voltage value for a predetermined period, the discharging unit is turned on.

5 Claims, 5 Drawing Sheets

(51) Int. Cl.
*H02M 1/32* (2007.01)
*H02M 1/00* (2006.01)

(58) Field of Classification Search
CPC ......... H02M 3/33507; H02M 3/33592; H02M 3/33523; H02M 3/3353; H02M 3/33569; H02M 7/217; H02M 7/21; H02M 7/12; H02M 7/2176
USPC ......... 363/21.12, 21.13, 21.15, 21.16, 21.17, 363/21.18
See application file for complete search history.

(56) References Cited

U.S. PATENT DOCUMENTS

| | | |
|---|---|---|
| 9,252,669 B2 | 2/2016 | Nate et al. |
| 9,537,417 B2 | 1/2017 | Shiroyama et al. |
| 2013/0027983 A1 | 1/2013 | Nate et al. |
| 2013/0147440 A1 | 6/2013 | Shiroyama et al. |
| 2013/0235622 A1* | 9/2013 | Masuda ............ H02M 3/33507 363/21.12 |
| 2013/0242626 A1 | 9/2013 | Li |
| 2014/0036561 A1 | 2/2014 | Sakurai et al. |
| 2014/0301117 A1 | 10/2014 | Hirabayashi |

OTHER PUBLICATIONS

International Preliminary Report on Patentability (IPRP) dated Aug. 29, 2017 in counterpart International Application No. PCT/JP2016/054530.
Japanese Office Action dated Aug. 21, 2018 issued in corresponding Japanese Application No. 2015-032442.
Extended European Search Report (EESR) dated Sep. 10, 2018 issued in counterpart European Application No. 16755293.4.

\* cited by examiner

SEMICONDUCTOR DEVICE FOR CONTROLLING POWER SOURCE

TECHNICAL FIELD

The present invention relates to a semiconductor device for power supply control, and particularly to a technique effectively used for a controlling semiconductor device that forms an insulated direct-current power supply device provided with a transformer for voltage conversion.

BACKGROUND ART

Examples of direct-current power supply devices include an insulated AC-DC converter which is structured by, for example, a diode bridge circuit that rectifies an alternating-current power supply, a DC-DC converter that steps down the direct-current voltage rectified in the diode bridge circuit to convert the voltage into a direct-current voltage with a desired potential and the like.

In a general insulated AC-DC converter, an X condenser is connected between AC terminals in order to attenuate the normal-mode noise and a discharging resistor is connected in parallel to the X condenser in order to quickly discharge the charges remaining in the X condenser when a plug is pulled out of an outlet.

CITATION LIST

Patent Literatures

Patent Literature 1: JP 2012-170289 A

SUMMARY OF INVENTION

Problem to be Solved by Invention

The AC-DC converter including the discharging resistor connected in parallel to the X condenser, however, always consumes power during the connection to the AC power supply. Therefore, the standby power consumption when the load is not applied or the converter is in the standby mode is increased.

Note that in the invention made in order to reduce the power consumption in the standby mode, the charges remaining in the X condenser are quickly discharged when the plug is pulled out (for example, see Patent Literature 1).

In the invention described in Patent Literature 1, the circuit (filter) that detects the disconnection of the plug is provided and the thyristor is used as the discharging means (switch), and discrete electric components are used to constitute the discharging circuit. This results in a problem that the discharging circuit is formed of more components.

The present invention has been made in view of the above, and an object thereof is to provide a technique for a controlling semiconductor device of an insulated direct-current power supply device, in which the charges remaining in the X condenser can be quickly discharged when the plug is pulled out, without increasing the number of external elements or components.

Another object of the present invention is to provide a semiconductor device for power supply control which incorporates a discharging circuit that quickly discharges the charges remaining in the X condenser when the plug is pulled out, without increasing the number of external terminals.

Solution to Problem

In order to achieve the above object, there is provided a semiconductor device for power supply control, that generates and outputs a driving pulse for performing control to turn on or off a switching element which supplies intermittently current to a primary-side winding wire of a transformer for voltage conversion, by inputting voltage in proportion to current flowing in the primary-side winding wire of the transformer and an output voltage detection signal from a secondary side of the transformer, the semiconductor device including:

an on/off control signal generation circuit which generates a control signal for performing control to turn on or off the switching element;

a high-voltage input start terminal to which alternating-current voltage of AC input or voltage rectified in a diode bridge is input;

a high-voltage input monitoring circuit which is connected to the high-voltage input start terminal and monitors voltage of the high-voltage input start terminal; and a discharging means which is connected between the high-voltage input start terminal and a ground point, wherein when the high-voltage input monitoring circuit has detected that a time for which the voltage of the high-voltage input start terminal is not lower than a predetermined voltage value continued for a predetermined period, the discharging means is turned on.

According to the above structure, without increasing the number of external elements or components, the charges remaining in the X condenser can be discharged quickly when the plug is pulled out. In addition, the discharging means and the circuit that generates the signal for operating the discharging means are formed on a chip of the semiconductor device for switching control, and moreover are connected to a high-voltage terminal. Therefore, an additional external terminal for outputting a signal that performs control to turn on or off the external discharging switch is unnecessary and without increasing the number of external terminals, that is, without increasing the chip size largely, the charges remaining in the X condenser can be discharged quickly when the plug is pulled out.

It is preferred that the semiconductor device for power supply control includes:

a power supply terminal to which voltage induced by an auxiliary winding wire of the transformer is input; and a switching means which is provided between the high-voltage input start terminal and the power supply terminal, wherein the discharging means is connected in series with the switching means between the high-voltage input start terminal and the ground point and when the high-voltage input monitoring circuit has detected that the time for which the voltage of the high-voltage input start terminal is not lower than the predetermined voltage value continued for a predetermined period, the switching means and the discharging means are turned on.

According to this structure, the voltage coming through the switching means is applied to the discharging means; therefore, the discharging means can be formed of an element with lower withstand voltage than that of the element in the case where the voltage does not come through the switching means. Therefore, the drastic increase in chip size can be suppressed.

It is preferred that the semiconductor device for power supply control includes a starting circuit which monitors the voltage of the high-voltage input start terminal and controls the switching means, wherein the switching means is controlled to be turned on or off in accordance with a value obtained by implementing an OR operation of an output of the high-voltage input monitoring circuit and an output of the starting circuit.

Thus, by using a mechanism (circuit) that performs control to turn on or off the switching means (power supply switch) provided between the high-voltage power supply terminal and the low-voltage power supply terminal, the power supply switch can be turned on or off using the control signal that turns on or off the discharging switch. Thus, the drastic increase in circuit scale, that is, the chip size can be avoided.

It is preferred that the high-voltage input monitoring circuit includes:

a voltage division circuit which is connected to the high-voltage input start terminal and divides the voltage of the high-voltage input start terminal;

a peak holding circuit which holds a peak voltage of the voltage divided by the voltage division circuit;

a voltage comparison circuit which compares the voltage divided by the voltage division circuit and a voltage obtained by proportionally reducing the voltage held in the peak holding circuit; and a timer circuit which measures a time for which the voltage divided by the voltage division circuit is not lower than the proportionally reduced voltage on the basis of an output of the voltage comparison circuit, wherein, when the timer circuit has measured a predetermined time that is determined in advance, the discharging means, or the switching means and the discharging means are turned on.

Thus, the circuit that generates the signal to operate the discharging means can be easily structured by combining the known circuit techniques, and if the specification of the power supply is changed, the circuit that can deal with the changed specification can be designed in a short period.

Advantageous Effects of Invention

According to the present invention, in a controlling semiconductor device for an insulated direct-current power supply device including a transformer for voltage conversion, that controls the output by turning on or off the current flowing in a primary-side winding wire, the charges remaining in the X condenser can be quickly discharged when the plug is pulled out, without increasing the number of external elements or components. Another effect of the present invention is in that a semiconductor device for power supply control incorporating the discharging circuit that quickly discharges the charges remaining in the X condenser when the plug is pulled out, without increasing the number of external terminals can be provided.

EMBODIMENTS FOR CARRYING OUT INVENTION

A preferred embodiment of the present invention will hereinafter be described with reference to the drawings.

Figure 1:
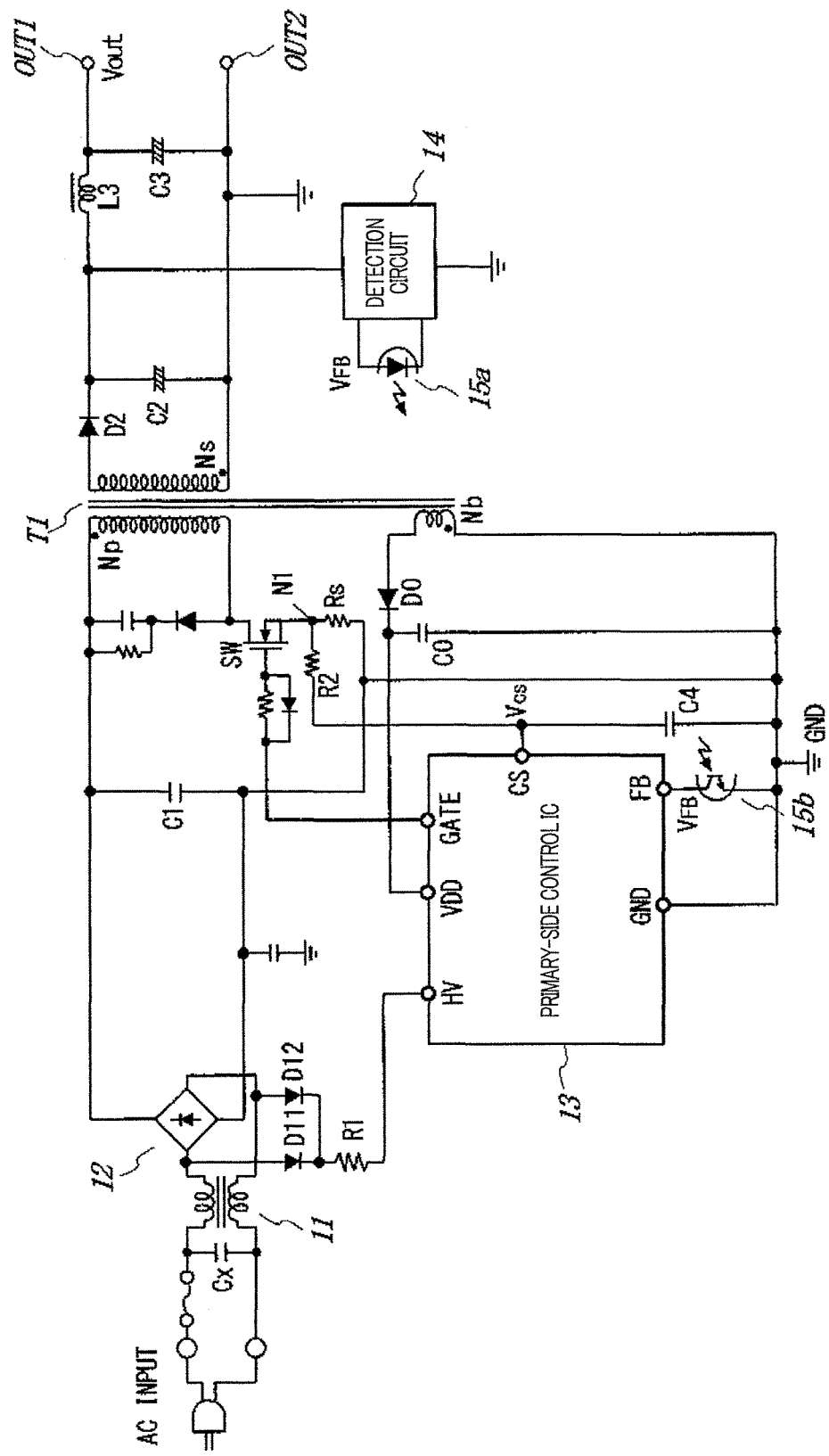
FIG. 1 is a circuit structure diagram illustrating one embodiment of an AC-DC converter corresponding to an insulated direct-current power supply device according to the present invention.

FIG. 1 is a circuit structure diagram illustrating one embodiment of an AC-DC converter corresponding to an insulated direct-current power supply device to which the present invention has been applied.

The AC-DC converter according to this embodiment includes: an X condenser Cx connected between AC input terminals for attenuating the normal-mode noise; a noise blocking line filter 11 including a common-mode coil and the like; a diode bridge circuit 12 that rectifies alternating-current voltage (AC); a smoothing condenser C1 that smooths the rectified voltage; a transformer T1 for voltage conversion including a primary-side winding wire Np, a secondary-side winding wire Ns, and an auxiliary winding wire Nb; a switching transistor SW including an N-channel MOSFET connected in series with the primary-side winding wire Np of this transformer T1; and a power supply control circuit 13 that drives the switching transistor SW. In this embodiment, the power supply control circuit 13 is formed as a semiconductor integrated circuit (hereinafter referred to as a power supply control IC) on one semiconductor chip formed of single-crystal silicon or the like.

On the secondary side of the transformer T1, a rectifying diode D2 connected in series with the secondary-side winding wire Ns and a smoothing condenser C2 connected between a cathode terminal of this diode D2 and the other terminal of the secondary-side winding wire Ns are provided. By supplying current intermittently to the primary-side winding wire Np, the alternating-current voltage is induced by the secondary-side winding wire Ns, and by rectifying and smoothing this induced alternating-current voltage, the direct-current voltage Vout in accordance with the winding wire ratio between the primary-side winding wire Np and the secondary-side winding wire Ns is output.

In addition, a coil L3 and a condenser C3 are provided on the secondary side of the transformer T1. The coil L3 and the condenser C3 form a filter for blocking the switching ripple noise and the like occurring in the switching operation on the primary side. Moreover, on the secondary side of the transformer T1, a detection circuit 14 for detecting the output voltage Vout and a photodiode 15*a* as an emission-side element of a photocoupler are provided. The photodiode 15*a* is connected to the detection circuit 14 and transmits a signal in accordance with the detected voltage to the power supply control IC 13. Then, on the primary side, a phototransistor 15*b* is provided as a light-reception-side element. The phototransistor 15*b* is connected between aground point and a feedback terminal FB of the power supply control IC 13 and receives a signal from the detection circuit 14.

On the primary side of the AC-DC converter according to this embodiment, a rectifying/smoothing circuit is provided. The rectifying/smoothing circuit includes a rectifying diode D0 connected in series with the auxiliary winding wire Nb, and a smoothing condenser C0 connected between the ground point GND and a cathode terminal of the diode D0. The voltage rectified and smoothed in the rectifying/smoothing circuit is applied to a power supply voltage terminal VDD of the power supply control IC 13.

On the other hand, the power supply control IC 13 includes a high-voltage input start terminal HV to which the voltage before being rectified in the diode bridge circuit 12 is applied through diodes D11 and D12 and a resistor R1, and is configured to operate based on the voltage from this high-voltage input start terminal HV when the power is input (just after a plug is inserted into an outlet).

In addition, in the present embodiment, a resistor Rs for current detection is connected between the ground point GND and a source terminal of the switching transistor SW, and moreover a resistor R2 is connected between a current detection terminal CS of the power supply control IC 13 and a node N1 between the switching transistor SW and the current detection resistor Rs. Furthermore, a condenser C4 is connected between the ground point and the current detection terminal CS of the power supply control IC 13. The resistor R2 and the condenser C4 form a low-pass filter.

Figure 2:
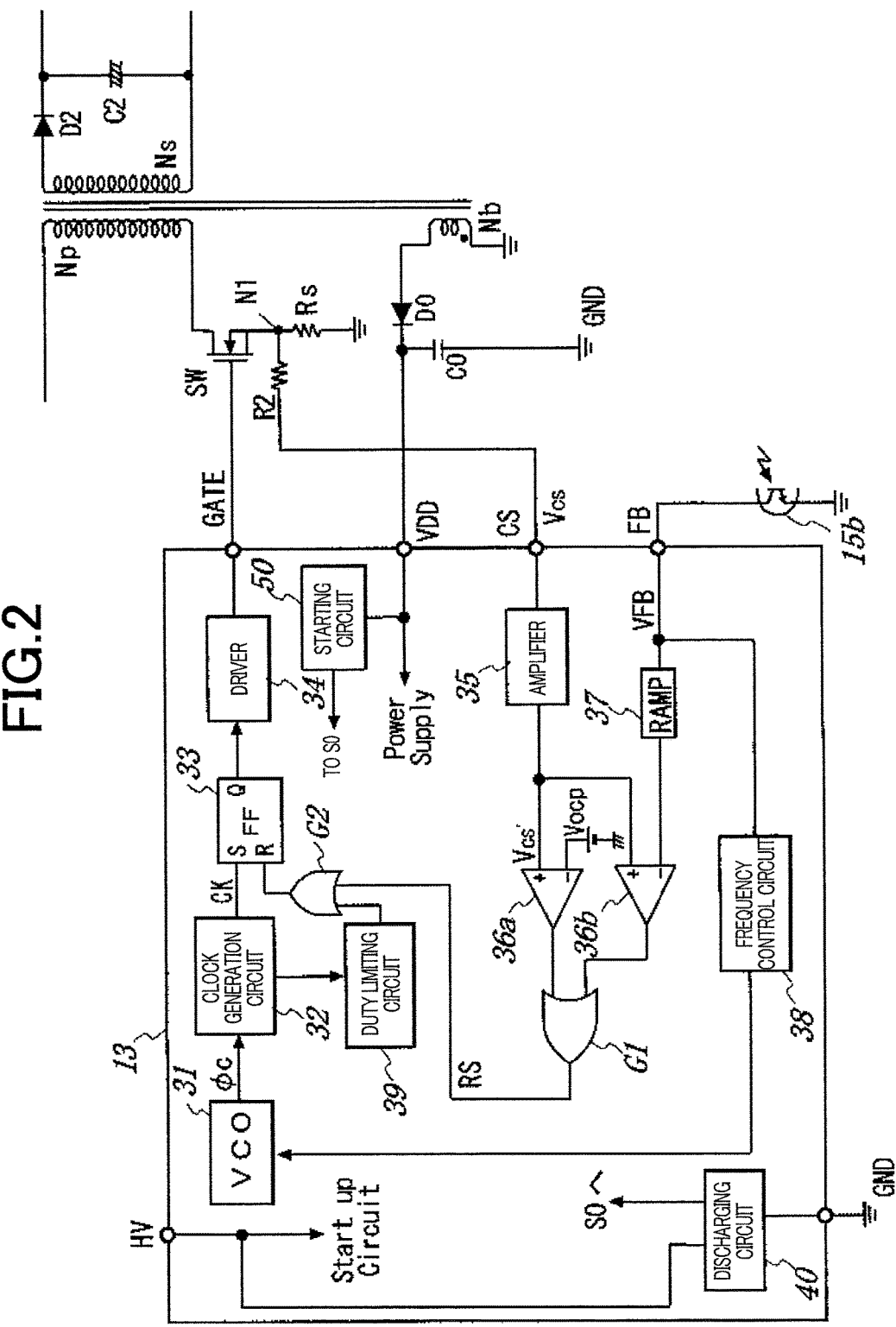
FIG. 2 is a block diagram illustrating a structure example of a primary-side switching power supply control circuit (power supply control IC) of a transformer in the AC-DC converter in FIG. 1.

Next, with reference to FIG. 2, a specific structure example of the power supply control IC 13 is described.

As illustrated in FIG. 2, the power supply control IC 13 according to this example includes: an oscillation circuit 31 that oscillates at the frequency in accordance with the voltage VFB of the feedback terminal FB; a clock generation circuit 32 including a circuit like a one-shot pulse generation circuit that generates a clock signal CK for providing the timing to turn on the primary-side switching transistor SW on the basis of an oscillation signal 4c generated in the oscillation circuit 31; an RS/flip-flop 33 that is set by the clock signal CK; and a driver (a driving circuit) 34 that generates a driving pulse GATE of the switching transistor SW in accordance with the output of the flip-flop 33.

Figure 3:
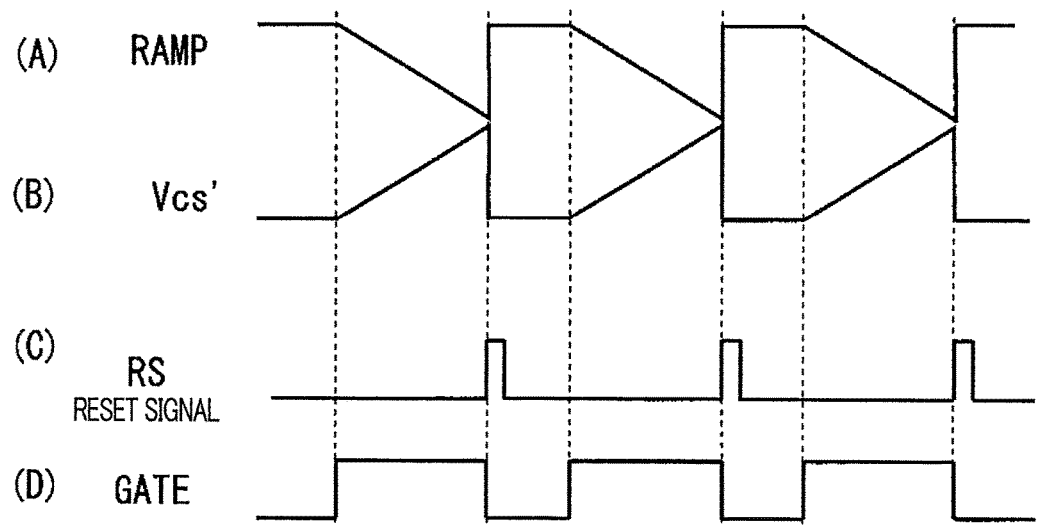
FIG. 3 shows waveform diagrams illustrating the change of voltage in each part of a power supply control IC in an example.

Moreover, the power supply control IC 13 includes: an amplifier 35 that amplifies the voltage Vcs input to the current detection terminal CS; a comparator 36a as a voltage comparison circuit that compares the voltage Vcs amplified by the amplifier 35 and a comparison voltage (threshold voltage) Vocp for monitoring the over-current state; a waveform generation circuit 37 that generates a voltage RAMP with a predetermined waveform as illustrated in FIG. 3(A) on the basis of the voltage VFB of the feedback terminal FB; a comparator 36b that compares a potential Vcs' with a waveform as illustrated in FIG. 3(B) that is amplified by the amplifier 35 and a waveform RAMP generated by the waveform generation circuit 37; and an OR gate G1 that implements the OR operation of the outputs of the comparators 36a and 36b. In the power supply control IC 13 according to the present example, the voltage RAMP in FIG. 3(A) is generated so as to decrease from the feedback voltage VFB with a constant inclination.

When the output RS of the OR gate G1 (see FIG. 3(C)) is input to a reset terminal of the flip-flop 33 through an OR gate G2, the timing to turn off the switching transistor SW is provided. Note that a pull-up resistor or a constant-current source is provided between the feedback terminal FB and an internal power supply voltage terminal, and the current flowing in the phototransistor 15b is converted into voltage by the resistor. The waveform generation circuit 37 is provided in order to deal with the sub-harmonic oscillation, and another structure may alternatively be employed in which the voltage VFB is input to the comparator 36b directly or after being level-shifted. Further, a soft start circuit may be provided which generates a signal for resetting the flip-flop 33 so as to increase the primary-side current gradually to prevent the excess current from flowing in the primary-side winding wire when the power is supplied and the significant voltage VFB or Vcs is not generated in the feedback terminal FB or the current detection terminal CS.

Figure 4:
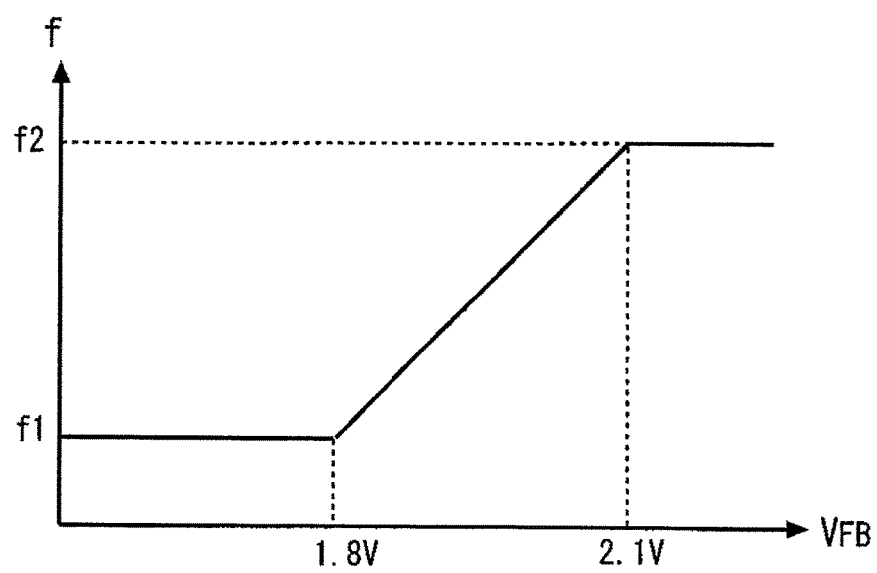
FIG. 4 is a characteristic diagram illustrating the relation between feedback voltage VFB and switching frequency in the power supply control IC in the example.

Furthermore, the power supply control IC 13 according to the present example includes a frequency control circuit 38 that changes the oscillation frequency, that is, the switching frequency of the oscillation circuit 31 on the basis of the voltage VFB of the feedback terminal FB in accordance with the characteristic as illustrated in FIG. 4. The frequency f1 in FIG. 4 is set to a value of, for example, 22 kHz and the frequency f2 is set to an arbitrary value in the range of, for example, 66 kHz to 100 kHz. The frequency control circuit 38 may be formed of a buffer such as a voltage follower and a clamp circuit. When the voltage of the feedback terminal FB is, for example, 1.8 V or less, the clamp circuit clamps the voltage to 1.8 V, and when the voltage is 2.1 V or more, the clamp circuit clamps the voltage thereof to 2.1 V. Although not shown, the oscillation circuit 31 includes an oscillator which is provided with a current source that supplies current in accordance with the voltage from the frequency control circuit 38 and whose oscillation frequency changes depending on the amount of current supplied from the current source.

The power supply control IC 13 according to the present example includes a duty limiting circuit 39 that generates a maximum duty reset signal for limiting the duty (Ton/Tcycle) of the driving pulse GATE so that the duty does not exceed a prescribed maximum value (for example, 85% to 90%) on the basis of the clock signal CK output from the clock generation circuit 32. The maximum duty reset signal output from the duty limiting circuit 39 is supplied to the flip-flop 33 through the OR gate G2 and when the pulse has reached the maximum duty, the flip-flop 33 is reset at that time; thus, the switching transistor SW is turned off immediately.

Furthermore, the power supply control IC 13 according to the present example includes a starting circuit (start circuit) 50 and a discharging circuit 40. The starting circuit 50 is connected to the high-voltage input start terminal HV, and when the voltage of this terminal is input, turns on a switch S0 (see FIG. 5), which is connected between the high-voltage input start terminal HV and the power supply voltage terminal VDD, to start the IC. The discharging circuit 40 detects whether the plug of the AC power supply is off from the outlet by monitoring the voltage of the high-voltage input start terminal HV and if it has been determined that the plug is off, discharges the X condenser Cx. Whether the plug is off can be determined by, for example, detecting that the AC input voltage has not decreased below a predetermined value (for example, 30% of peak value) within a certain time (for example, 30 ms).

Figure 5:
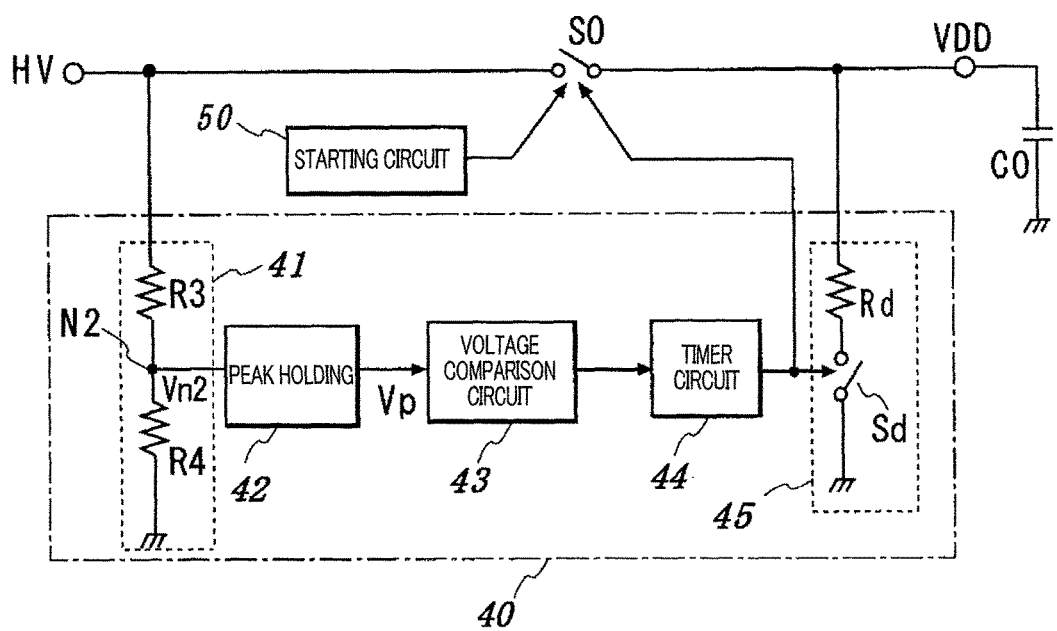
FIG. 5 is a circuit structure diagram illustrating a structure example of a discharging circuit in the power supply control IC in the example.

FIG. 5 illustrates a structure example of the discharging circuit 40 in the power supply control IC illustrated in FIG. 2.

As illustrated in FIG. 5, the discharging circuit 40 includes: a voltage division circuit 41 including resistors R3 and R4 that are connected in series between the high-voltage input start terminal HV and the ground point; a peak holding circuit 42 that holds the peak value of the voltage divided by the voltage division circuit 41; a voltage comparison circuit 43 that compares a potential Vn2 at a connection node N2 between the resistors R3 and R4 with a voltage Vth, which is obtained by proportionally reducing a voltage Vp held in the peak holding circuit 42, and determines whether Vn2 is lower than Vth; a timer circuit 44 that measures the time when Vn2 is not lower than Vth; and a discharging means 45 including a resistor Rd and a switch Sd that are connected so as to be in series with the switch S0 between the high-voltage input start terminal HV and the ground point.

Here, the switch S0 is a switch connected between the high-voltage input start terminal HV and the power supply voltage terminal VDD, and controlled by the starting circuit 50. For example, the switch S0 is formed of a MOS transistor with high withstand voltage. The switch S0 is turned on immediately after the alternating-current voltage is input to the high-voltage input start terminal HV, and when the voltage of the VDD terminal has become a predetermined value (for example, 21 V) or more, the switch S0 is turned off and the internal circuit starts to operate. Then, after that, the voltage from the auxiliary winding wire is supplied to the power supply voltage terminal VDD and the internal circuit operates by the voltage from the power supply voltage terminal VDD while the switch S0 remains off.

The ratio between the resistance values of the resistors R3 and R4 is set so that the voltage of the high-voltage input start terminal HV becomes the voltage (for example, 6 V) that is less than or equal to the withstand voltage of the element (s) included in the discharging circuit 40.

The voltage comparison circuit 43 compares the potential Vn2 at the connection node N2 and the value of 30% of the peak value of the potential Vn2 at the connection node N2, and detects whether Vn2 is not lower than the value of 30% of the peak value of the potential Vn2. The timer circuit 44 measures how long Vn2 is not lower than Vp and if it has been determined that the measured time is more than 30 ms, for example, the timer circuit 44 outputs the signal for turning on the switch S0 and the discharging switch Sd. The resistance value of the resistor Rd is set to the resistance value at which the current is limited so that the discharging speed becomes 47 V/s, for example. The timer circuit 44 is configured to be reset every time Vn2 becomes lower than Vp and starts to measure 30 ms.

Figure 6:
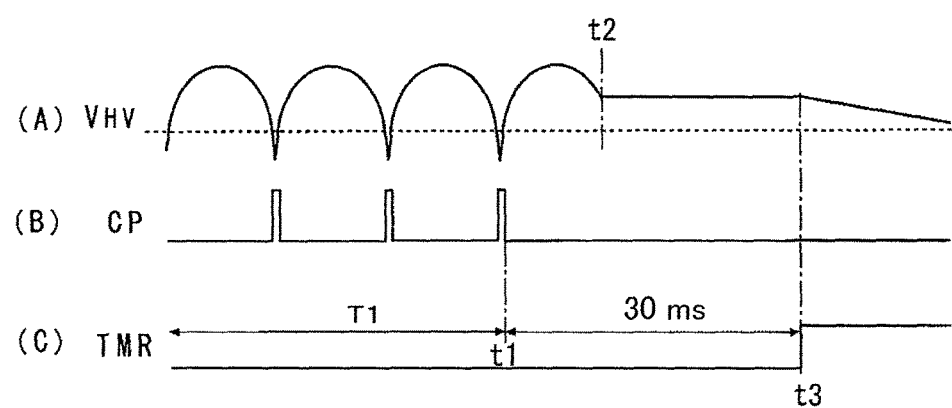
FIG. 6 is a timing chart expressing the operation timing when the discharging circuit in FIG. 5 performs discharging.

FIG. 6 expresses the operation timing of the discharging circuit 40 illustrated in FIG. 5. In FIG. 6, the solid line of (A) expresses the waveform of the voltage VHV of the high-voltage input start terminal HV and the dashed line expresses the value of 30% of the peak value. In FIG. 6(B), the output CP of the voltage comparison circuit 43 is expressed and in FIG. 6(C), the output TMR of the timer circuit 44 is expressed.

As FIG. 6 indicates, in the normal period T1, the pulses CP are output in the cycle corresponding to the cycle of the voltage waveform of the high-voltage input start terminal HV. If the plug is pulled out at the timing t2, the voltage comparison circuit 43 no longer outputs the pulse CP. Then, at the time t3 when 30 ms have passed from the time t1 at which the last pulse is output, the output TMR of the timer circuit 44 changes into the high level and the discharging switch Sd is turned on to discharge the X condenser, and the voltage VHV of the high-voltage input start terminal HV decreases quickly.

In this manner, in the power supply control IC including the discharging circuit 40 as illustrated in FIG. 5, the charges remaining in the X condenser can be released quickly if the AC input is blocked as can be seen from FIG. 6, and in the normal operation state, the starting circuit 50 turns off the switch S0 for power supply; therefore, the power loss due to the discharging resistor Rd can be avoided. Note that the power loss occurs always in the voltage division circuit 41, but the resistance value of the discharging resistor Rd is regarded as being necessary to define the discharging speed; on the other hand, the resistance values of the resistors R3 and R4 in the voltage division circuit 41 can be set to the resistance value that is sufficiently higher than that of the discharging resistor Rd. Thus, as the whole discharging circuit 40, the power loss can be reduced as compared to before.

Figure 7:
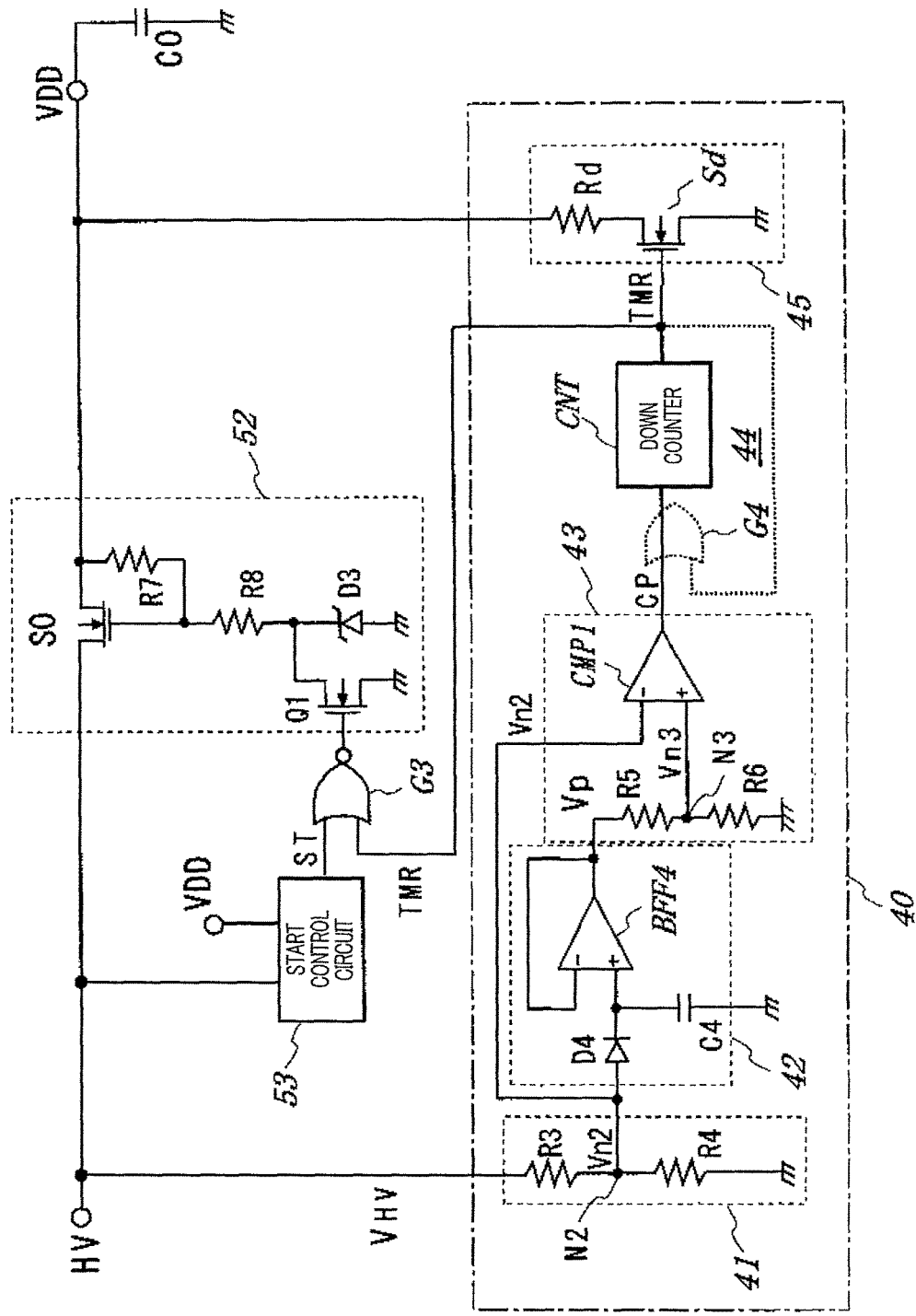
FIG. 7 is a circuit structure diagram illustrating a more specific circuit structure example of the discharging circuit in FIG. 5.

FIG. 7 illustrates a specific circuit structure example of the discharging circuit 40 in FIG. 5 included in the power supply control IC 13 according to the present embodiment.

As illustrated in FIG. 7, the discharging circuit 40 includes the voltage division circuit 41, the peak holding circuit 42, the voltage comparison circuit 43, the timer circuit 44, and the discharging means 45. Among these circuits, the peak holding circuit 42 includes a diode D4 whose anode terminal is connected to the connection node N2, a capacitor element C4 connected between a cathode terminal of the diode D4 and the ground point, a buffer BFF4 including a voltage follower whose input terminal is connected to a connection node N3 between the diode D4 and the capacitor element C4.

The voltage comparison circuit 43 includes: resistors R5 and R6 for voltage division that are connected in series between the ground point and the output terminal of the BFF4; and the comparator CMP1 that compares the voltage (a potential Vn3 at the connection node N3) divided by the resistors R5 and R6 with the voltage (the potential Vn2 at the connection node N2) divided by the voltage division circuit 41. By performing setting so that the resistors R5 and R6 have a resistance ratio of 2:1, the voltage of ⅓ of the peak voltage held by the capacitor element C4 appears at the connection node N3. This enables the comparator CMP1 to detect whether the potential Vn2 at the connection node N2 is lower than the value approximately 30% of the peak value thereof.

The timer circuit 44 includes a down counter CNT that performs counting by an oscillation signal ϕc from an oscillation circuit 31 or a clock signal CK from a clock generation circuit 32, and its output changes to the high level when the timer circuit 44 has counted the clocks corresponding to 30 ms. In addition, the output of the comparator CMP1 is input to the reset terminal of the down counter CNT, and the down counter CNT restarts the operation of counting 30 ms every time the output pulse of the comparator CMP1 is input.

Usually, the pulse CP from the comparator CMP1 is input before 30 ms passes and therefore the output does not change, but once the plug is pulled out and the reset pulse CP is no longer input from the comparator CMP1, the output of the down counter CNT changes into the high level when 30 ms have passed and by that output, the discharging switch Sd is turned on.

In the present example, the discharging switch Sd is formed of the enhancement type MOS transistor with the middle withstand voltage, while the switch S0 for power supply is formed of the depression type MOS transistor with the high withstand voltage. Accordingly, as illustrated in FIG. 7, the gate terminal corresponding to the control terminal of the switch S0 for power supply is connected to a switch control circuit 52. The switch control circuit 52 includes: resistors R7, R8 and an enhancement type MOS transistor Q1 which are connected in series between a drain terminal of the switch S0 and the ground point; and a Zener diode D3 for clamping which is provided in parallel to the transistor Q1. By turning on the transistor Q1, voltage that is negative relative to the source voltage is applied to the gate terminal of the switch S0 as the depression type MOS transistor, so that the channel can be set to the non-conductive state (state in which the drain current does not flow). When the transistor Q1 is turned off, the switch S0 becomes to be in an on state.

An output signal of a NOR gate G3 that implements the OR operation of a signal ST from the start control circuit 53 and a signal TMR from the timer circuit 44 of the discharging circuit 40 is applied to the gate terminal of the MOS transistor Q1, and by turning off Q1 when the discharging switch Sd is turned on, the MOS transistor as the switch S0 for power supply is turned on. The start control circuit 53 incorporates the voltage comparator, and turns on the switch S0 when the voltage of the power supply voltage terminal VDD is, for example, 6.5 V or less, and turns off the switch S0 when the voltage of the VDD is, for example, 21 V or more. In this specification, the combination of the switch control circuit 52 and the start control circuit 53 corresponds to the starting circuit 50.

Note that as expressed by a dashed line in FIG. 7, a logic circuit such as an OR gate G4 is provided in front of the reset terminal of the down counter CNT and a signal obtained by implementing the OR operation of the output of the comparator CMP1 and the output of the down counter CNT is input to the reset terminal of the down counter CNT. Once the output of the down counter CNT changes into the high level, the time measuring operation of the down counter CNT may be stopped.

The discharging resistor Rd may be replaced by a constant-current circuit. The order of connecting the discharging resistor Rd or the constant-current circuit and the discharging switch Sd may be opposite.

Although the discharging resistor Rd and the discharging switch Sd are provided so as to be in series with the switch S0 for power supply between the high-voltage input start terminal HV and the ground point in the above example, the discharging resistor Rd and the discharging switch Sd may be provided between the high-voltage input start terminal HV and the ground point in principle. Such a connection, however, requires use of a switch with high withstand voltage as the MOS transistor that forms the discharging switch Sd. In view of this, by providing the resistor Rd and the switch Sd so as to be in series with the switch S0 for power supply as described in the above example, the MOS transistor with low withstand voltage can be employed and in this case, the chip size can be reduced.

The invention made by the present inventor has been described in detail based on the embodiment, but the present invention is not limited to the embodiment. For example, in the embodiment, the switching transistor SW that supplies current intermittently to the primary-side winding wire of the transformer is an element separated from the power supply control IC 13, but this switching transistor SW may be taken into the power supply control IC 13 to form one semiconductor integrated circuit.

INDUSTRIAL APPLICABILITY

In the description of the above embodiment, the present invention is applied to the power supply control IC that forms a flyback type AC-DC converter. However, the present invention is also applicable to a power supply control IC that forms a forward type or a quasi-resonance type AC-DC converter and moreover so-called a primary side regulation (hereinafter, PSR) type AC-DC converter that controls the output voltage on the secondary side just by the information acquired on the primary side.

REFERENCE SIGNS LIST

11 line filter
12 diode bridge circuit (rectification circuit)
13 power supply control circuit (power supply control IC)
14 secondary-side detection circuit (detection IC)
15a diode on emission side of photocoupler
15b transistor on light reception side of photocoupler
31 oscillation circuit
32 clock generation circuit
34 driver (driving circuit)
35 amplifier (non-inversion amplification circuit)
36a comparator for over-current detection (over-current detection circuit)
36b comparator for voltage/current control (voltage/current control circuit)
37 waveform generation circuit
38 frequency control circuit
39 duty limiting circuit
40 discharging circuit
41 voltage division circuit
42 peak holding circuit (high-voltage input monitoring circuit)
43 voltage comparison circuit (high-voltage input monitoring circuit)
44 timer circuit (high-voltage input monitoring circuit)
45 discharging means
50 starting circuit
HV high-voltage input start terminal
VDD power supply voltage terminal (Power supply terminal)

The invention claimed is:
1. A semiconductor device for power supply control, that generates and outputs a driving pulse to turn on or off a switching element which intermittently supplies current to a primary-side winding wire of a transformer for voltage conversion, by inputting voltage in proportion to the current flowing in the primary-side winding wire of the transformer and an output voltage detection signal from a secondary side of the transformer, the semiconductor device comprising:
    an on/off control signal generation circuit which generates a control signal to turn on or off the switching element;
    a high-voltage input start terminal to which an alternating-current voltage of an AC input or a voltage rectified by a diode bridge is input;
    a high-voltage input monitoring circuit which is connected to the high-voltage input start terminal and monitors voltage of the high-voltage input start terminal; and
    a discharging unit which is connected between the high-voltage input start terminal and a ground point,
    wherein:
    when the high-voltage input monitoring circuit has detected a state in which the voltage of the high-voltage input start terminal is higher than a predetermined voltage value and that the state continues for a predetermined period, the discharging unit is turned on;
    the high-voltage input monitoring circuit comprises:
        a voltage division circuit which is connected to the high-voltage input start terminal and divides the voltage of the high-voltage input start terminal;

a peak holding circuit which holds a peak voltage of the voltage divided by the voltage division circuit;

a voltage comparison circuit which compares the voltage divided by the voltage division circuit and a voltage obtained by proportionally reducing the voltage held in the peak holding circuit; and a timer circuit which measures a time for which the voltage divided by the voltage division circuit is not lower than the proportionally reduced voltage based on an output of the voltage comparison circuit, and when the timer circuit has measured a predetermined time that is determined in advance, the discharging unit is turned on.

2. A semiconductor device for power supply control, that generates and outputs a driving pulse to turn on or off a switching element which intermittently supplies current to a primary-side winding wire of a transformer for voltage conversion, by inputting voltage in proportion to the current flowing in the primary-side winding wire of the transformer and an output voltage detection signal from a secondary side of the transformer, the semiconductor device comprising:

an on/off control signal generation circuit which generates a control signal to turn on or off the switching element;

a high-voltage input start terminal to which an alternating-current voltage of an AC input or a voltage rectified by a diode bridge is input;

a high-voltage input monitoring circuit which is connected to the high-voltage input start terminal and monitors voltage of the high-voltage input start terminal;

a discharging unit which is connected between the high-voltage input start terminal and a ground point;

a power supply terminal to which a voltage induced by an auxiliary winding wire of the transformer is input and which supplies power to an internal circuit of the semiconductor device; and a switching unit which is provided between the high-voltage input start terminal and the power supply terminal, wherein:

the discharging unit is connected in series with the switching unit between the high-voltage input start terminal and the ground point, and when the high-voltage input monitoring circuit has detected that the state in which the voltage of the high-voltage input start terminal is higher than the predetermined voltage value and that the state continues for a predetermined period, the switching unit and the discharging unit are turned on.

3. The semiconductor device for power supply control according to claim 2, further comprising:

a starting circuit which monitors the voltage of the high-voltage input start terminal and controls the switching unit, wherein the switching unit is controlled to be turned on or off in accordance with a value obtained by implementing an OR operation of an output of the high-voltage input monitoring circuit and an output of the starting circuit.

4. The semiconductor device for power supply control according to claim 2, wherein the high-voltage input monitoring circuit comprises:

a voltage division circuit which is connected to the high-voltage input start terminal and divides the voltage of the high-voltage input start terminal;

a peak holding circuit which holds a peak voltage of the voltage divided by the voltage division circuit;

a voltage comparison circuit which compares the voltage divided by the voltage division circuit and a voltage obtained by proportionally reducing the voltage held in the peak holding circuit; and a timer circuit which measures a time for which the voltage divided by the voltage division circuit is not lower than the proportionally reduced voltage based on an output of the voltage comparison circuit, wherein when the timer circuit has measured a predetermined time that is determined in advance, the discharging unit, or the switching unit and the discharging unit are turned on.

5. The semiconductor device for power supply control according to claim 3, wherein the high-voltage input monitoring circuit comprises:

a voltage division circuit which is connected to the high-voltage input start terminal and divides the voltage of the high-voltage input start terminal;

a peak holding circuit which holds a peak voltage of the voltage divided by the voltage division circuit;

a voltage comparison circuit which compares the voltage divided by the voltage division circuit and a voltage obtained by proportionally reducing the voltage held in the peak holding circuit; and a timer circuit which measures a time for which the voltage divided by the voltage division circuit is not lower than the proportionally reduced voltage on the basis of an output of the voltage comparison circuit, wherein when the timer circuit has measured a predetermined time that is determined in advance, the discharging unit, or the switching unit and the discharging unit are turned on.

\* \* \* \* \*